Sept. 26, 1967  A. R. LUNDEBERG  3,343,885
METHOD AND APPARATUS FOR ORIENTING AND FEEDING ARTICLES
Filed Oct. 21, 1965  4 Sheets-Sheet 4
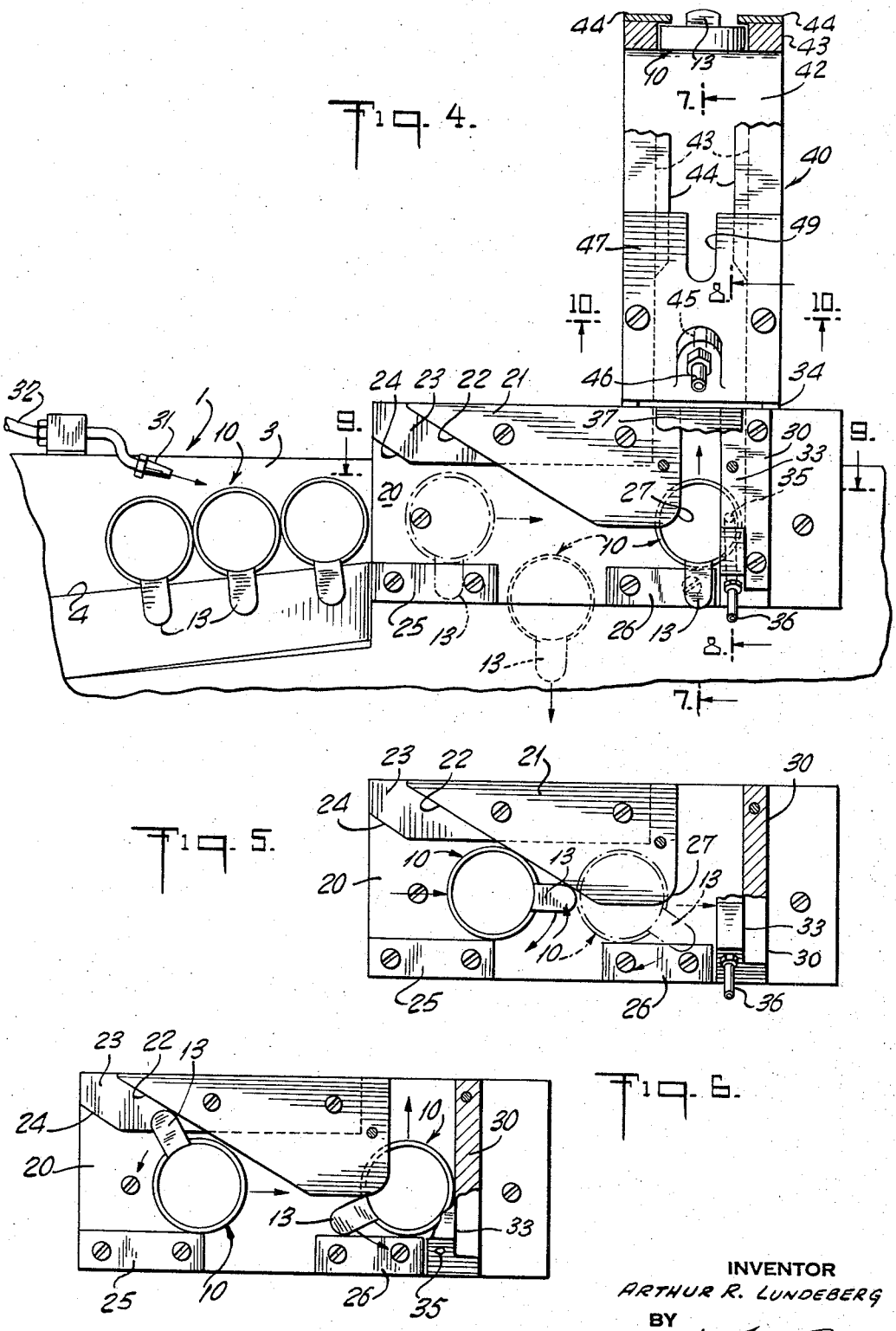
INVENTOR
ARTHUR R. LUNDEBERG
BY
ATTORNEY United States Patent Office 3,343,885
Patented Sept. 26, 1967

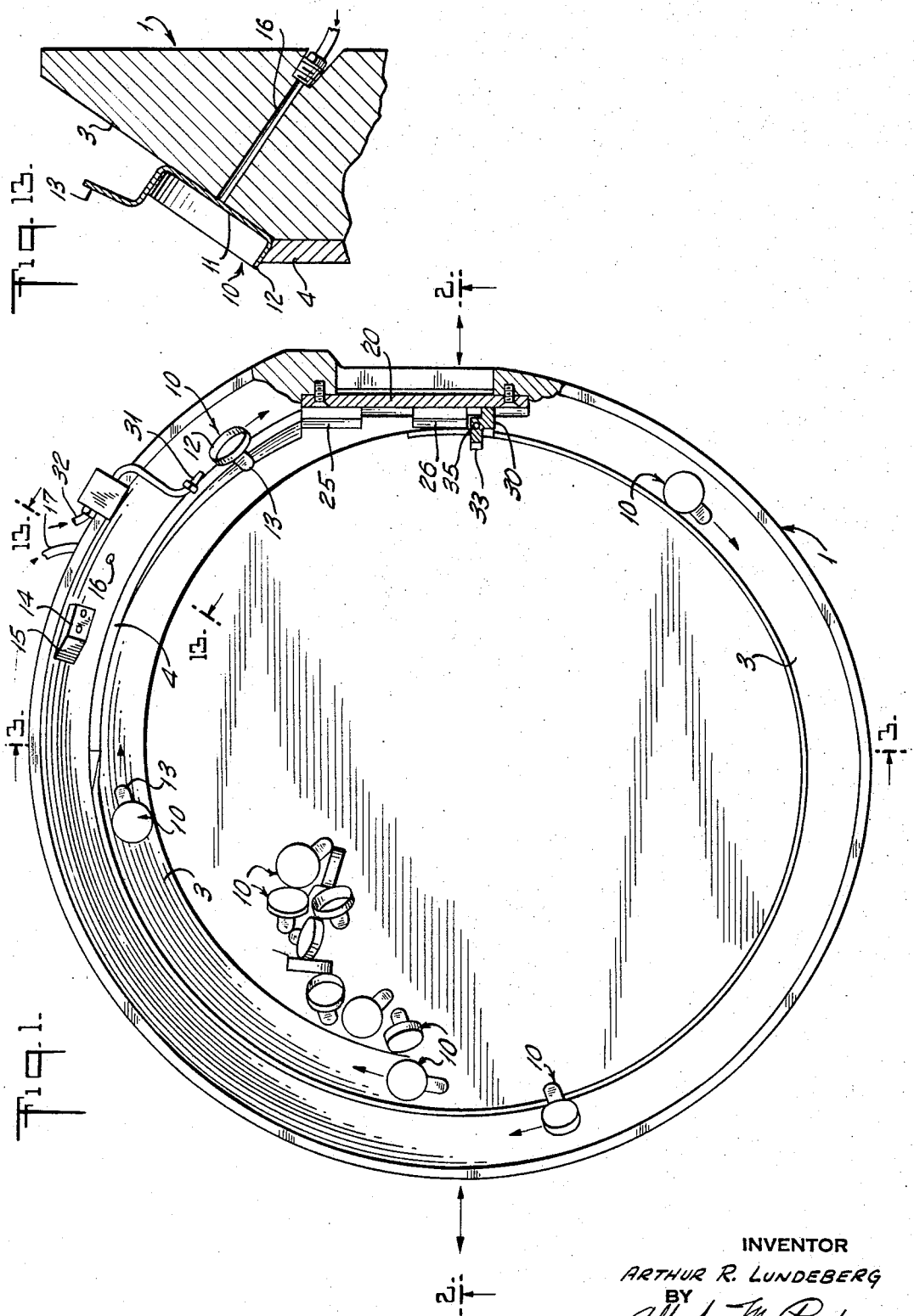

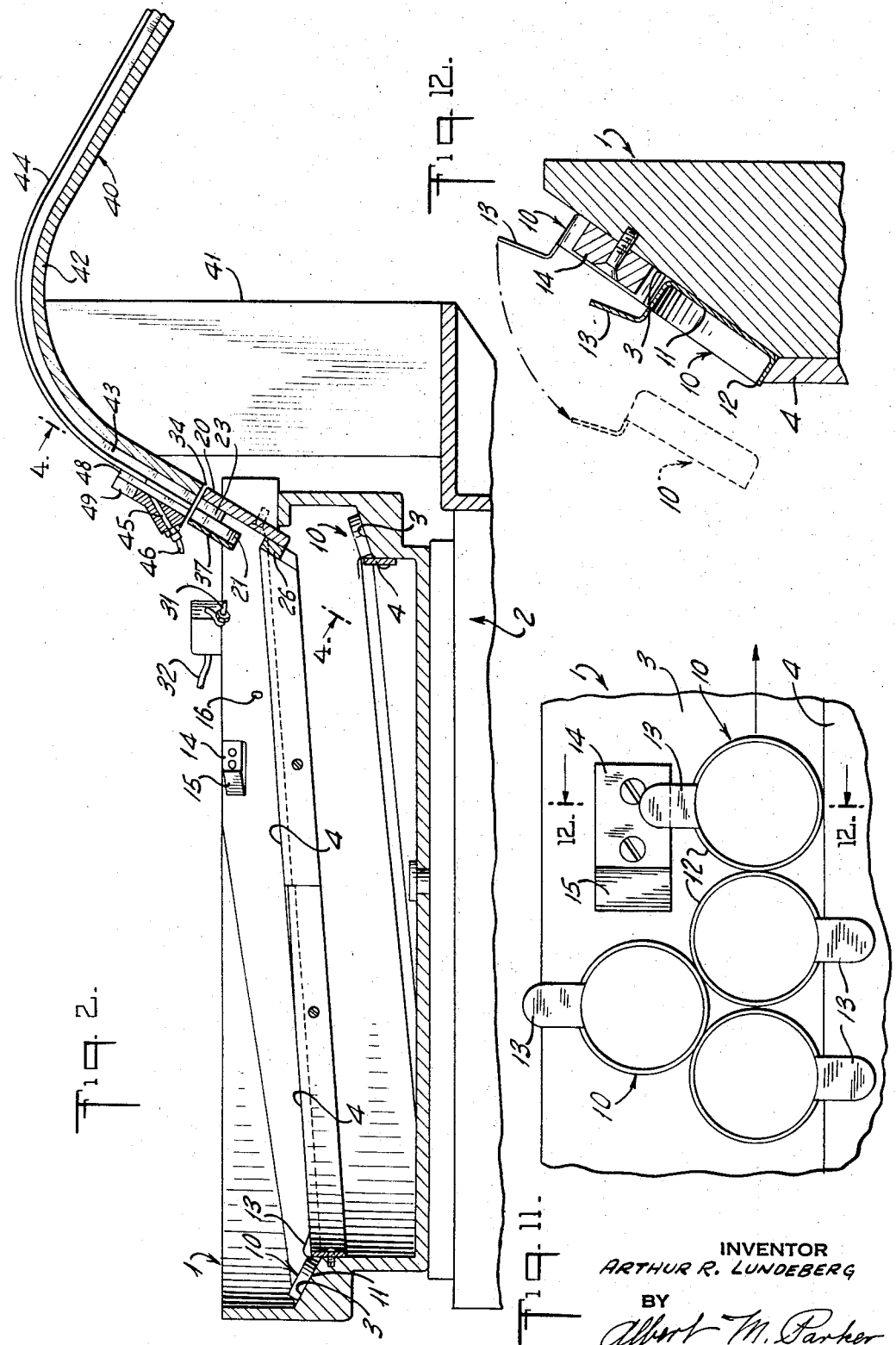

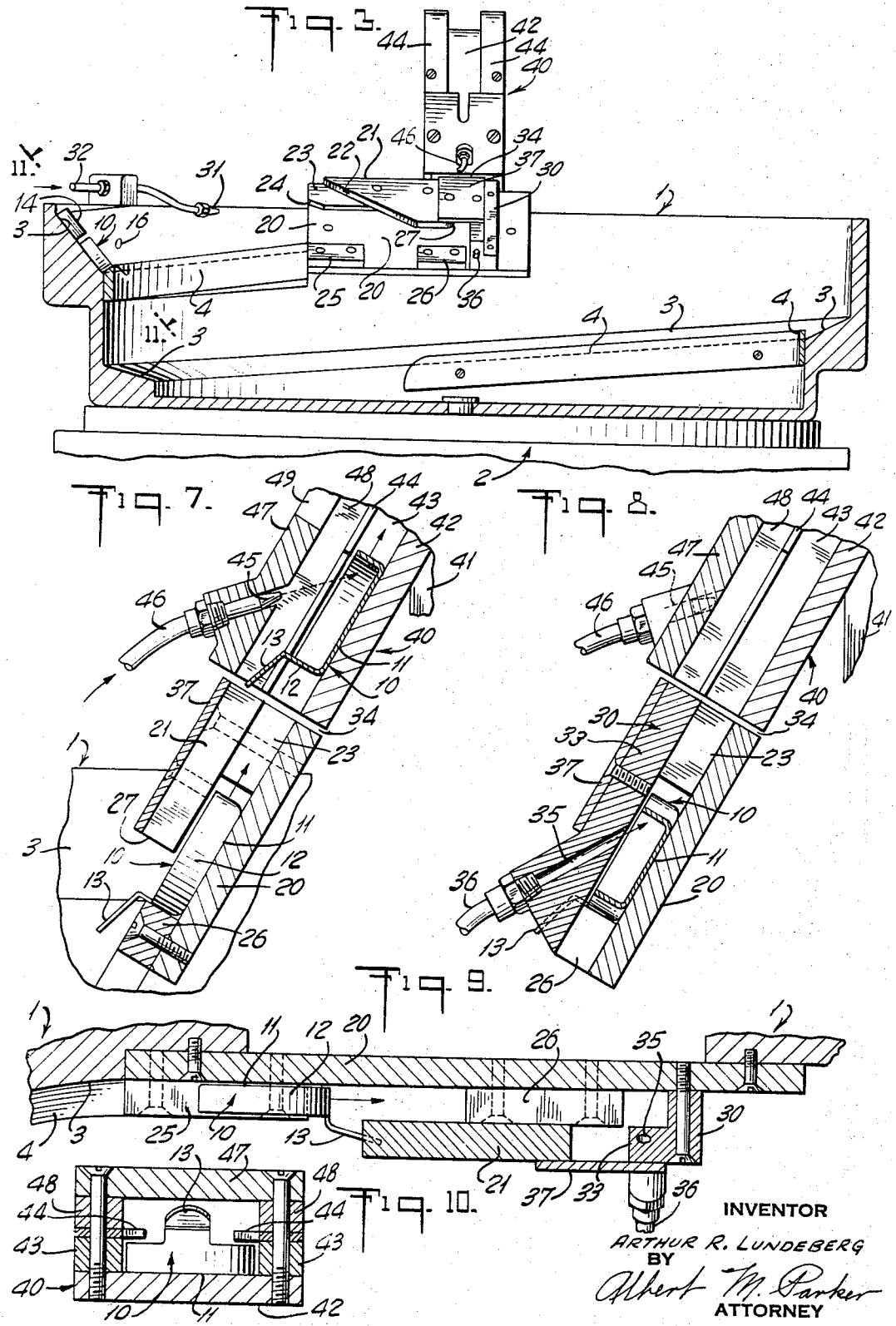

3,343,885
METHOD AND APPARATUS FOR ORIENTING AND FEEDING ARTICLES
Arthur R. Lundeberg, East Hartford, Conn., assignor to American Flange & Manufacturing Co., Inc., New York, N.Y., a Delaware company
Filed Oct. 21, 1965, Ser. No. 499,574
5 Claims. (Cl. 302—2)

This invention relates to a method and apparatus for orienting and feeding articles and is particularly concerned with an improvement in the field of vibratory bowl material handling.

Although vibratory bowls have broven highly effective for feeding certain types of articles at moderate speeds, these devices have been found to be limited in their ability to orient and feed relatively bulky, irregularly shaped articles at the speeds required for automated production operations. The orienting and feeding of articles with which the method and apparatus of this invention are concerned can be broken down into two stages. In the first stage articles, deposited in bulk within the bowl, are fed in a helical path about the periphery of the bowl by the vibratory action thereof and past a series of orienting stations. This handling of the articles within the bowl must be carried out accurately and efficiently since recycling of the parts within the bowl should be minimized to avoid possible damage to the articles. In the second stage the articles are discharged from the bowl in properly oriented position. Speed is important in order to clear the orienting stations and to feed the properly oriented articles from the bowl at a high rate.

Inasmuch as the articles are conveyed along a helical path within the bowl, a common practice has been to discharge the parts in a direction tangent to that path. The advantage thought to reside in this arrangement being that to discharge the parts from the bowl along an approximate continuation of the path followed within the bowl would result in higher efficiency than an arrangement that required the parts to substantially change their direction of travel upon leaving the bowl.

The instant invention completely reverses this prior art concept in disclosing a method and apparatus for handling relatively bulky, radially unsymmetrical articles by feeding such articles past a series of orienting stations spaced along the helical path of a vibrating bowl and discharging the parts from the bowl in a plane extending at an angle to the vertical axis of the bowl so that the parts move upwardly and outwardly from the side wall of the bowl. It has been found that this unique arrangement is capable of feeding parts, otherwise considered difficult to handle, at speeds far in excess of the limits ordinarily imposed on vibratory bowl feeders. This high feed rate has been attained by means of a relatively simple, inexpensive device while at the same time substantially improving upon the overall accuracy and efficiency of the feeding operation.

It is accordingly a principal object of this invention to provide a new and improved method for orienting and feeding articles.

Another object is to provide apparatus for carrying out that method.

A further object is to provide an improved vibratory bowl article feeder.

A still further object is to provide a vibratory bowl capable of orienting and feeding bulky, unsymmetrical articles at high speed.

A still further object is to provide a new and improved method and apparatus for discharging articles from a vibratory bowl.

A more detailed object is to provide a method and apparatus for feeding parts along the helical path of a vibratory bowl and discharging such parts from the bowl in a direction axially upwardly and outwardly with respect to the side wall of the bowl.

Further and more detailed objects will in part be obvious and in part pointed out as the description of the invention, taken in conjunction with the accompanying drawing, proceeds.

In that drawing:

FIG. 1 is a top plan view of the vibratory bowl of the invention and for carrying out the method thereof with the article discharge structure partially broken away;

FIG. 2 is a cross-sectional elevation view taken on lines 2—2 of FIG. 1 and looking in the direction of the arrows;

FIG. 3 is a cross-sectional elevation view taken on lines 3—3 of FIG. 1 and looking in the direction of the arrows;

FIG. 4 is a sectional view taken on lines 4—4 of FIG. 2 and looking in the direction of the arrows;

FIGS. 5 and 6 are partial side views similar to FIG. 4 illustrating the operation of one of the article orienting stations of the invention;

FIG. 7 is a cross-sectional elevation view taken on lines 7—7 of FIG. 4 and looking in the direction of the arrows;

FIG. 8 is a cross-sectional elevation view taken on lines 8—8 of FIG. 4 and looking in the direction of the arrows;

FIG. 9 is a cross-sectional top view taken on lines 9—9 of FIG. 4 and looking in the direction of the arrows;

FIG. 10 is a cross-sectional end view taken on lines 10—10 of FIG. 4 and looking in the direction of the arrows;

FIG. 11 is an enlarged elevational view of another of the article orienting stations taken on lines 11—11 of FIG. 3 and looking in the direction of the arrows;

FIG. 12 is an enlarged cross-sectional elevation view of another of the orienting stations taken on lines 12—12 of FIG. 11 and looking in the direction of the arrows; and FIG. 13 is an enlarged cross-sectional elevation view of still another article orienting stations taken on lines 13—13 of FIG. 1 and looking in the direction of the arrows.

Referring now to FIGS. 1–3 of the drawing, the vibratory feeder bowl 1, into which the randomly oriented articles 10 are either hand deposited in bulk or metered by a suitable metering device, is supported on a base 2 which acts as a housing for a conventional vibrating mechanism (not shown) driven either electromagnetically, mechanically or by air. A helical ramp 3 if formed in the side wall of the bowl starting at the bottom of the bowl and making about one and one-half turns to a point tangent to the upper edge of the side wall. The plane surface of the ramp, at its point of beginning, rises from the surface of the bottom of the bowl and forms a shelf or ledge extending at right angles to the axis of the bowl for a short distance and then gradually inclines downwardly toward the center of the bowl until at the point of tangency with the upper edge of the side wall said surface is inclined at approximately 30 degrees from the axis of the bowl. A retaining wall 4 is positioned adjacent the inner edge of the ramp 3 starting at the point where the plane surface of the ramp begins its gradual incline. A plurality of article orienting stations are positioned adjacent the ramp 3. For purposes of illustration the particular articles 10 being fed and oriented, but without limitation thereto, as more particularly shown in FIG. 12, are lightweight metal cap-shaped members each having a disc-like back panel 11, a cylindrical wall 12 therearound and a radially projecting ear 13. Each article is radially unsymmetrical and has a central axis extending axially through the panel 11 and a radial axis lying in the plane of the panel. The articles 10 are initially conveyed, generally in clusters, up the helical ramp 3 by the vibratory motion of the bowl 1 and are held on the ramp by the retaining wall 4. During the travel up the ramp 3 the articles first lie with the article panel 11 parallel to the ramp with the open side extending up or down and then, in accordance with the inclination of the surface of the ramp, gradually are positioned on their wall 12 with their ears swung downwardly over the retaining wall 4 as shown in FIG. 2. Other orienting means are provided to positively assure this position as will be described hereinafter.

The first orienting station that the articles pass is shown in detail in FIGS. 11 and 12 and comprises a cam plate 14 extending outwardly from the plane surface of the ramp 3 a distance less than the thickness of the article wall 12 and spaced from the upper edge of the retaining wall 4 a distance slightly in excess of the diameter of the article being conveyed. The leading or downstream edge of the cam 14 has an inclined surface 15 extending from the plane surface of the ramp 3. The function of the cam plate 14 is to positively arrange the articles in a single row as they travel along the helical ramp. In FIG. 11 an article is shown riding on top of articles properly seated in a single row against the retaining wall 4. Upon contact with the inclined surface 15 of the cam plate 14 such an elevated article is kicked off into the bowl while the single row of articles seated upon the retaining wall pass through this station untouched below the cam plate 14 as shown in FIG. 12.

In the next orienting station only those articles properly oriented about a respective radial axis are allowed to pass therethrough. This station is illustrated in detail in FIG. 13 and comprises an air jet fed through an orifice 16 in the ramp 3 from an air supply line 17. Articles passing over the orifice 16 with their open side extending outwardly toward the center of the bowl tend to adhere to the ramp 3 due to the venturi effect created by the flow of air between the panel 11 of the adjacent article and ramp surface. In the event an article remains on the ramp at this point in an inverted open side down position, that is with the back panel 11 spaced from the ramp surface, the article will be blown off into the bowl.

The articles continue along the ramp 3 to the final orienting station where they are properly oriented about their respective central axis before being discharged from the bowl. With particular reference to FIGS. 4, 5 and 6 it can be seen that as the articles approach the upper edge of the side wall of the bowl 1 they are fed onto a flat insert plate 20 which forms a continuation of the helical ramp 3. A camming plate 21 is secured to the upper edge of the insert plate 20 and is spaced therefrom by a spacer block 23 having a thickness sufficient to allow the body of the article 10 to freely pass between it and the plate 20. The leading edges of the camming plate 21 and spacer block 23 are chamfered at 22 and 24 respectively to assure that the ear 13 on each article 10 is directed downwardly as it passes between plates 20 and 21. Secured to the lower edge of plate 20 and in alignment with the spacer block 23 are a pair of spaced apart support blocks 25 and 26. The support block 25 is positioned adjacent rail 4 the upper surface of which forms continuation of the supporting surface of rail 4 for supporting the wall 12 of the article. The upper surface of support block 26 is positioned in horizontal alignment with block 25 but is spaced from block 25 a distance slightly greater than the diameter of the body of article 10 forming a space through which an article can fall.

As the articles 10 are conveyed along the block 25 the camming edge 22 assures that the ear 13 is directed downwardly. If the ear is leading, as shown in FIG. 5, contact with the camming edge 22 will rotate the article in a clockwise direction. If the ear is trailing, as shown in FIG. 6, contact with the camming edge 22 will rotate the article in a counterclockwise direction. Each article then, upon reaching the block 26, is properly oriented open side up and with the ear extending in a downward direction. Movement of the fully oriented article along plate 20 terminates upon contacting the end block 30 which is also secured to the insert plate 20. To assist the articles in their travel across the insert plate 20 and support blocks 25, 26 and into engagement with the end block 30, there is provided an air jet 31, connected to an air supply line 32, which is positioned above the articles and beyond the leading edge of the plate 20 as shown in FIG. 4. Under normal feeding conditions the air jet 31 will cause the articles to move along plate 20 and the support blocks 25 and 26 and to jump the gap between blocks 25, 26 and into contact with the end block 30. However, in the event the feeding is stopped outside the bowl for any reason the articles will back up in line and drop through the space between the support blocks 25 and 26 into the bowl for recycling. Thus a controlled relief is provided so as to prevent the possibility of jamming and/or damage to the articles at some other point.

As seen in FIGS. 3, 4 and 9 a discharge path is formed at right angles to the path of the fed articles along plate 20 and the support blocks 25 and 26. The trailing edge of plate 21 extends over a portion of the discharge path. The end block 30 has an overhang portion 33 which extends over another portion of the discharge path parallel to and spaced from the trailing edge of plate 21 and confining the body of the article in said discharge path. The ear 13 on each article extends outwardly in the space between the trailing edge of plate 21 and the overhang portion 33. A cover plate 37 is positioned over the outer surface of the plate 21 and the overhang portion 33 covering the space therebetween to provide a passageway with sufficient clearance for free movement of the ear 13 on each article. The discharge path just described, can be seen in FIG. 2 as initially extending axially outwardly and upwardly at a 60° angle with respect to the axis of the bowl. Although this particular angle has been found to give good results for this particular article, the invention is not to be construed as limited thereto, since the concept of having the discharge passageway extend up out of the bowl is applicable to other and different articles. In FIGS. 5 and 6 it can be seen that it is impossible for the article to rotate so that the ear 13 is leading when the article reaches the discharge path. The overhung portion 33 prevents the ear from rotating in a counterclockwise direction as shown in FIG. 5 and the rounded lead in corner 27 of the trailing edge of plate 21 prevents the ear from rotating in a clockwise direction. At the upper edge of the insert plate 20 there is a gap indicated at 34 across which the article must jump from the vibrating bowl structure to a stationary track 40 positioned in alignment with the discharge path. The article is accelerated along the discharge path, as shown in FIGS. 4 and 9, upwardly across the gap 34 into the track 40 by means of an air jet 35, connected to air supply line 36, and mounted in the end block overhang portion 33.

The track 40 into which the articles are discharged is shown in FIG. 2 as being secured to a bracket 41 which is in turn held stationary by being connected to the base 2. A strip 42, as seen in FIG. 10, forms the base of the track 40 and has secured thereon a pair of side rails 43 and overhang strips 44 which together form a partially enclosed passageway for the body of the article with the ear 13 projecting outwardly between the strips 44. In order to assist in accelerating the articles away from the bowl an additional air jet 45, connected to air supply line 46, is mounted in the cover plate 47 fastened to the entrance end portion of the track 40 and spaced from the overhang strips 44 by means of spacer blocks 48 to provide clearance for the ear 13. Formed within the plate 47 is a cut out portion 49 to allow the air to quickly escape.

It has been discovered that stopping the substantially horizontal movement of the article within the bowl and then accelerating it radially and upwardly out of the bowl increases the feeding rate of such articles. Once each article sequentially contacts the end block 30 it has been fully oriented with an absolute minimum of interference with its movement along the helical path 3. One problem, heretofore unsolved, has been to get the articles out of the bowl in a simple efficient manner without losing the orientation and without slowing the feed rate. Curved and twisted tracks present jamming problems and also make it difficult to jump the gap between vibrating structure and stationary structure. The article discharge arrangement of this invention has several advantages over the known prior art arrangements. To begin with it is simple in construction and operation. There are no moving parts and just as important the article itself does not have to be moved about its own axis or oriented as it is discharged. For this reason the device of the invention is capable of operating at a higher feed rate than that usually associated with vibratory feeders. The speed at which the air jet 35 acelerated the articles from their horizontal path into their discharge path more than compensates for the momonetary hesitation when each article contacts the end block 30. Furthermore, the point where each article jumps from vibrating structure to stationary structure has heretofore been an inherent trouble spot, particularly in those applications where the article being fed has an abrupt or irregular outline. However, by employing the discharge arrangement of the invention the articles are conveyed across the gap 34 at high speed and in fully oriented position thus minimizing any possibility of jamming or even slowing down at this critical area.

Summarizing the operation of the invention, the articles are first bulk deposited in the vibratory bowl 1 whereupon they are conveyed, generally in clusters, along the helical path 3 by the vibratory motion of the bowl. At the first orienting station the articles are arranged in a single row by means of the cam plate 14 which kicks any excess articles back into the bowl. At the next orienting station those articles positioned open face up pass over the air jet 16 due to the venturi effect thereby created while those articles positioned open face down are blown back into the bowl. The final orientation of the article is effected by the camming plate 21 which cams the article ears 13 to a downwardly extending position. The articles are now fully oriented and in position to be discharged from the bowl. The article discharge is then carried out by accelerating the articles radially outwardly and upwardly with respect to the plane of the bowl.

The method and apparatus of the invention thus constitute a substantial improvement in the field of vibratory bowl feeders in providing a device which can accurately orient and feed relatively bulky radially unsymmetrical articles at a rate heretofore thought beyond the capability of a vibratory bowl. Furthermore the novel concept of discharging the fully oriented articles axially upwardly out of the bowl across the gap between vibrating and stationary structure is fast, efficient and trouble free.

Other and different variations of the invention may well suggest themselves to those skilled in the art without departing from the scope and spirit of the invention. For example the helical path along which the articles are conveyed during the orienting process could be located around the outside of the bowl instead of the inside. In which case the article discharge might be directed axially upwardly and inwardly. In either case the principle of the invention herein disclosed would still apply. It is accordingly to be understood that the method and apparatus for carrying out that method, shown in the accompanying drawings and described in the foregoing specification, are to be considered as illustrative of the invention and are not to be considered as being set forth in a limiting sense.

Having described my invention what I claim as new and desire to secure by Letters Patent is:

1. The method of orienting and feeding radially unsymmetrical articles comprising imparting lateral vibratory motion to a mass of randomly oriented unsymmetrical articles, conveying said articles along a substantially helical path, limiting the passage of articles along said path to articles having the same respective orientation about a first axis, imparting to said articles the same respective orientation about a second axis perpendicular to said first axis, terminating the movement of said articles along said helical path, accelerating said oriented articles upwardly from said path and releasing said oriented articles from said vibratory motion in a direction substantially perpendicular to said motion.

2. The method of orienting and feeding articles comprising imparting lateral vibratory motion to a mass of randomly oriented unsymmetrical articles, conveying said articles along a substantially helical path, imparting to said articles the same respective orientation as said articles are conveyed along said path, terminating the movement of said articles along said path, accelerating said oriented articles axially upwardly and radially from said path and releasing said oriented articles from said vibratory motion in a direction substantially perpendicular to said motion.

3. Apparatus for orienting and feeding articles comprising a vibratory bowl, a substantially helical path disposed about the periphery of said bowl, vibrating means operatively connected to said bowl for driving randomly oriented articles from a central mass within said bowl along said helical path, orienting means on said path for imparting to articles passing therethrough the same respective orientation, stop means for terminating the movement of the articles along said path, means for accelerating the oriented articles axially upwardly and radially out of said bowl in a direction substantially perpendicular to the vibratory motion of said articles.

4. Apparatus for orienting and feeding articles comprising a vibratory bowl, a substantially helical path disposed about the periphery of said bowl, vibrating means operatively connected to said bowl for driving randomly oriented articles from a central mass within said bowl along said helical path, orienting means on said path for imparting to articles passing therethrough the same respective orientation, stop means for terminating the movement of the articles along said path and means for accelerating the oriented articles upwardly out of said bowl in a direction substantially perpendicular to the vibratory motion of said articles and into a stationary discharge track.

5. Apparatus for orienting and feeding articles as in claim 4, wherein article relief means are provided on said path between said orienting means and said stop means for directing articles into said bowl for recycling when the bowl over feeds said discharge track.

References Cited

UNITED STATES PATENTS

| 3,012,651 | 12/1961 | Hawkes | 198—33 |
| 3,034,645 | 5/1962 | Groppe. | |
| 3,266,613 | 8/1966 | Grafius | 198—33 |

EVON C. BLUNK, *Primary Examiner.*

EDWARD A. SROKA, *Examiner.*

A. C. HODGSON, *Assistant Examiner.*